United States Patent [19]

Kuhlmann

[11] 4,316,432
[45] Feb. 23, 1982

[54] BATTERY CAGE ARRANGEMENT FOR LAYING HENS

[76] Inventor: Josef H. Kuhlmann, Konigstrasse 51, D-4401 Laer, Fed. Rep. of Germany

[21] Appl. No.: 80,493

[22] Filed: Oct. 1, 1979

[30] Foreign Application Priority Data

Jul. 21, 1979 [DE] Fed. Rep. of Germany ... 7920942[U]

[51] Int. Cl.³ .................... A01K 3104; B65G 45/02
[52] U.S. Cl. .............................. 119/22; 198/500
[58] Field of Search ............. 119/15, 22, 48; 74/257; 222/356, 357, 358; 198/498, 500

[56] References Cited

U.S. PATENT DOCUMENTS

| | | | |
|---|---|---|---|
| 667,201 | 2/1901 | Edison | 198/500 |
| 1,274,219 | 7/1918 | Ulbrecht | 119/15 |
| 2,843,086 | 7/1958 | Graham | 119/22 |
| 4,173,279 | 11/1979 | Lichti et al. | 198/500 |

*Primary Examiner*—Gene Mancene
*Assistant Examiner*—Robert P. Swiatek
*Attorney, Agent, or Firm*—Merchant, Gould, Smith, Edell, Welter & Schmidt

[57] ABSTRACT

A dung removal conveyor (18, 20) for multi-deck poultry battery-nest installations with dropping plates arranged under the roost grates, including a single chain (12) centrally connected to scraper crosspieces (14) so as to allow limited movement therebetween, an oil pan (22), and oscillating plunger apparatus (27) for dipping into the oil pan and then extending to a position where oil carried thereby falls to lubricate the conveyor.

5 Claims, 6 Drawing Figures

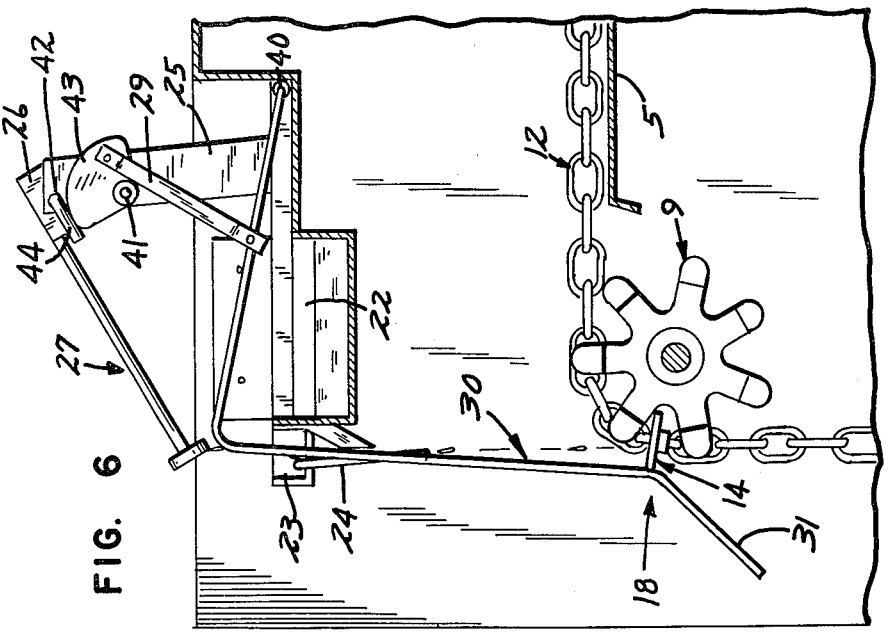
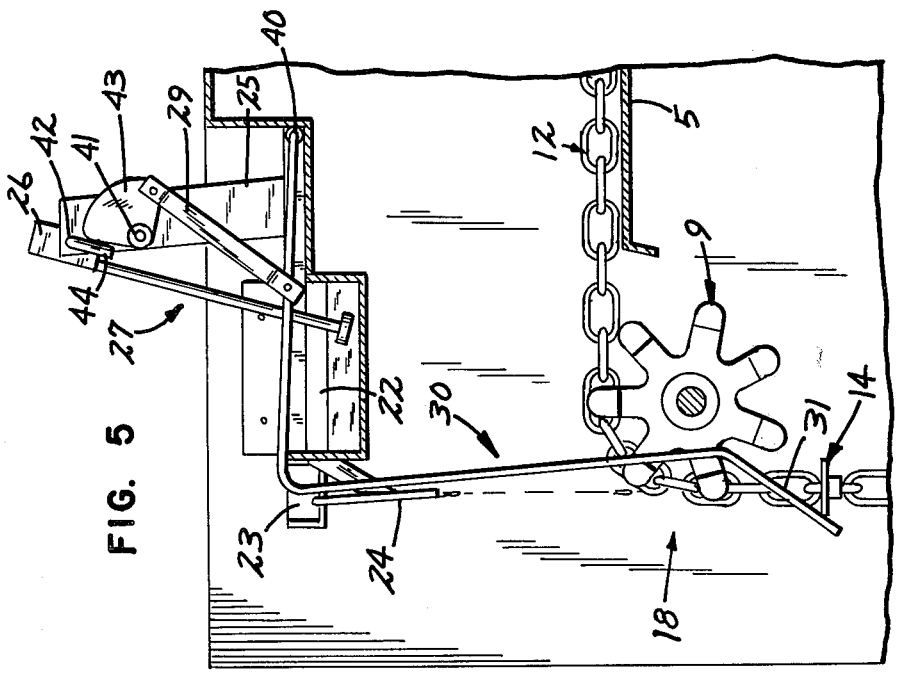

BATTERY CAGE ARRANGEMENT FOR LAYING HENS

TECHNICAL FIELD

The invention relates to a dung removal conveyor for multi-deck poultry battery-nest installations with droppings plates, arranged under roost grates, over which dung removal conveyors are movable, each dung removal conveyor consisting of traction means drawing scraper crosspieces and led over guide pulleys, and looping around the installation in the longitudinal direction in such a way that the top conveyor sweeps across the droppings plate of a higher deck, and the lower run sweeps across the droppings plate of a lower deck.

BACKGROUND OF THE PRIOR ART

Dung removal conveyors of the type characterized above are described in German Auslegeschrift 19 36 20.

With these known mechanisms, there always exists the problem that corrosion phenomena appear, in particular in the region of connection between scraper crosspiece and draw chain, and the service life of the draw chain is also impaired because of the fact that the draw chain must move in a very corrosive medium and, additionally, the possibilities, up until now, for lubricating this chain with oil were not possible or were too costly.

The task set forth for the invention is to improve the service life of the draw chain and simultaneously to prevent wear phenomena in the area of contact between draw chain and guide pulleys.

BRIEF SUMMARY OF THE INVENTION

This task forming the basis of the invention is resolved by the measures mentioned in the claims, in particular by the fact that there is arranged above the draw chain of the dung removal conveyor an oil supply in which can be immersed a plunger that periodically deposits onto the draw chain of the dung removal conveyor oil that it has picked up by being immersed, and thereby advantageously coats, on the one hand, the area of contact between guide pulleys and draw chain, and, on the other hand, the area of contact between draw chain and scraper crosspiece.

Corrosion phenomena in these areas are excluded by these measures, and simultaneously achieved is that the entire chain is provided with a film of oil that, to a great extent, bars an attack by the corrosive droppings and a lubricating film is provided in the area of contact between guide pulleys and draw chain that not only prevents corrosion phenomena in this region but also decreases friction so that the operation of the dung removal conveyor is simplified.

BRIEF DESCRIPTION OF THE DRAWING

One exemplary embodiment of the invention will be explained in the following with the aid of the drawings, in which:

FIGS. 5 and 6 show, in a sketched illustration, the motion of the plunger.

DETAILED DESCRIPTION OF THE INVENTION

Figure 1:
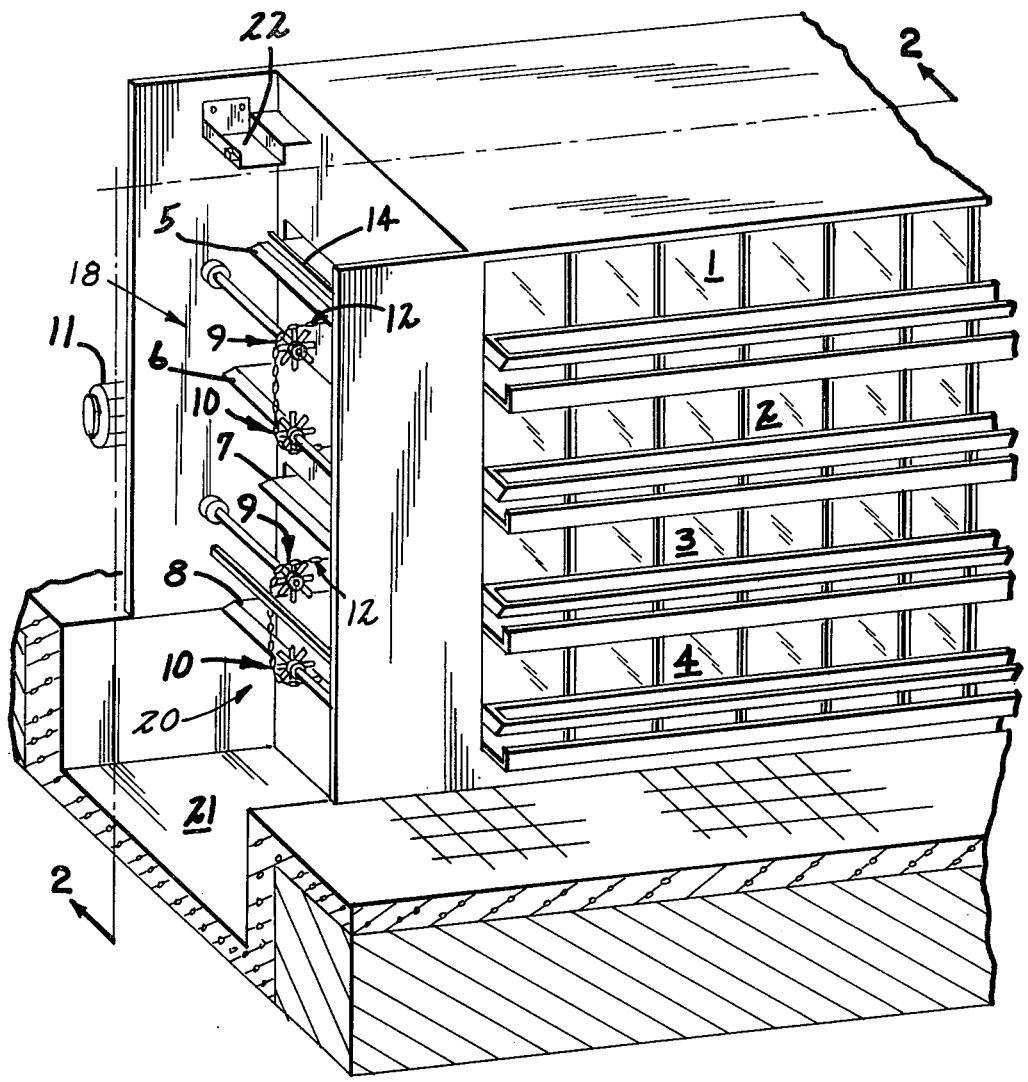
FIG. 1 shows diagrammatically a partial view onto a nest installation in accordance with the invention.
Figure 2:
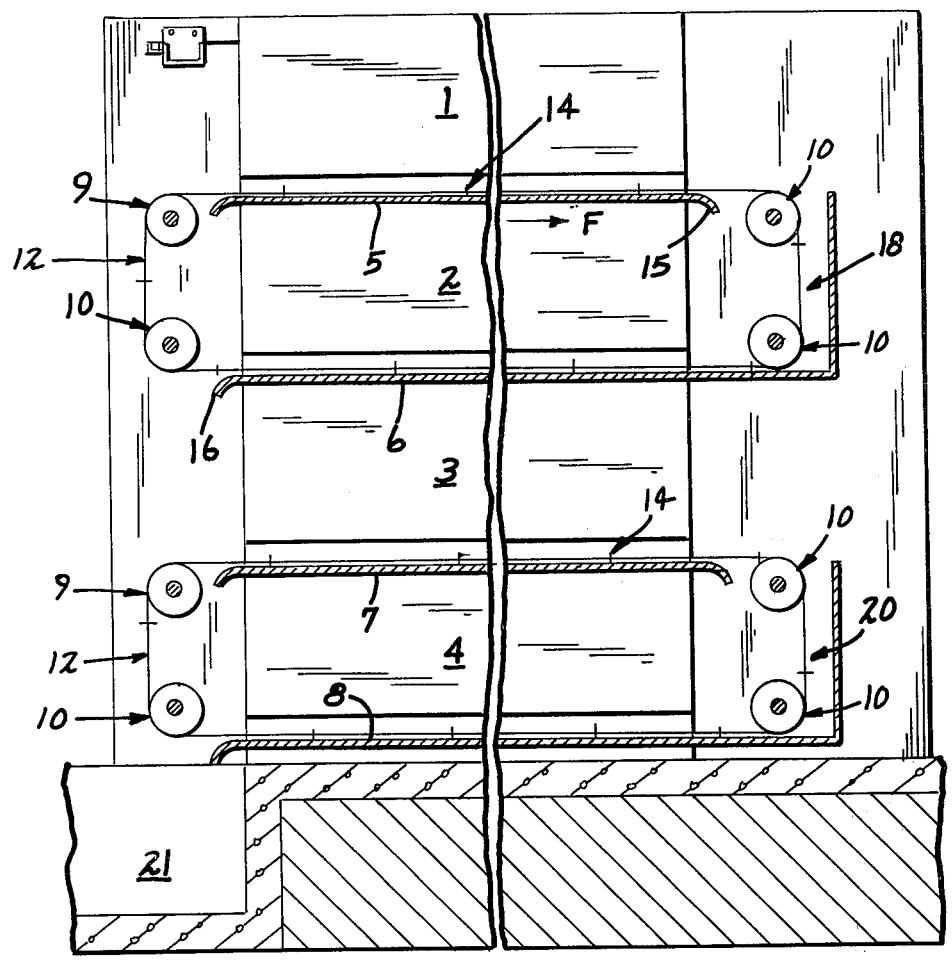
FIG. 2 shows schematically a section through the nest installation taken along line 2—2 of FIG. 1.

Designated in FIG. 1 by 1, 2, 3 and 4 are four decks of a poultry battery-nest installation arranged over one another that consist of individual cages in which the hens are placed, with the cages closed off on their under sides by a roost grating, and equipped at their front sides with appropriate feeding systems as well as with appropriate egg collecting contrivances which, however, are not an object of the invention and therefore need not be explained any further.

Arranged under each roost grate of the cage decks is respectively a droppings plate 5, 6, 7 and 8, on which are collected the droppings falling through the roost grate. Designated by 9 and 10 are guide pulleys where, in the case of the example of embodiment illustrated, pulleys 9 are structured as driving pulleys that are driven by a motor 11, which can for example be constructed as an electric motor. Led about the pulleys 9 and 10 are chains 12 that bear scraper crosspieces 14, and obtained in this fashion are the dung removal conveyors 18 and 20.

Figure 3:
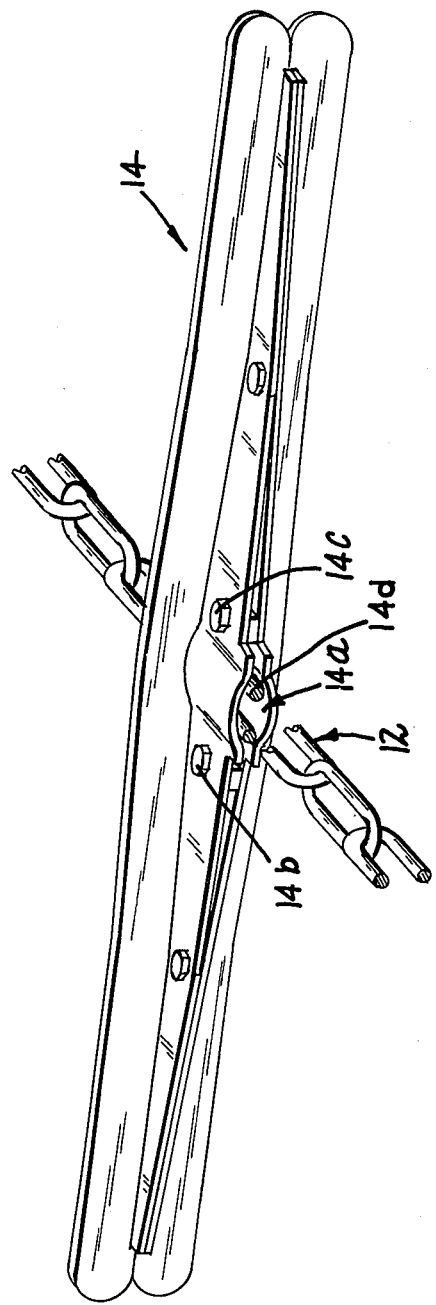
FIG. 3 shows pictorially, in enlarged scale, the connection between draw chain and scraper crosspiece.

Designated by 14 in FIG. 3 is the scraper crosspiece that connects to the draw chain 12. Here, the draw chain 12 is provided centrally with the scraper crosspiece 14. The scraper crosspiece supports an eyelet 14a which is fastened to the scraper crosspiece, for example via fastening screws 14b and 14c, with this eyelet 14a gripping about the chain member 14d lying, in its width extension, parallel to the longitudinal extension of scraper crosspiece 14, but is selected to be large enough so that play is possible here between eyelet 14a and draw chain 12, i.e. therefore between crosspiece and chain so that, with revolving movement of the draw chain 12, a continuous movement results in the region of connection, which here leads to solid particles, i.e. droppings particles, being cast off.

The droppings plate 5 that lies below the first deck is structured so that the cast-off end 15 still lies, in the vertical projection, in the region of droppings plate 6 that is swept by the dung removal conveyor 18, said droppings plate being arranged below the second deck 2. Achieved by this is that the droppings collected on the droppings plate 5 can fall from the dung removal conveyor 18, moving in the direction of arrow F, onto the droppings plate 6, so that now the conveyor, on its return trip, carries along the droppings collected on the droppings plate 6 and discharges these droppings over the discharge end 16.

From the discharge end 16, the droppings reach, via a slide or in freefall, a droppings collection space designated generally by 21 that is formed, for example, in the foundation for the overall installation.

The dung removal conveyor 20 looping around the lower deck works in the same manner.

Figure 4:
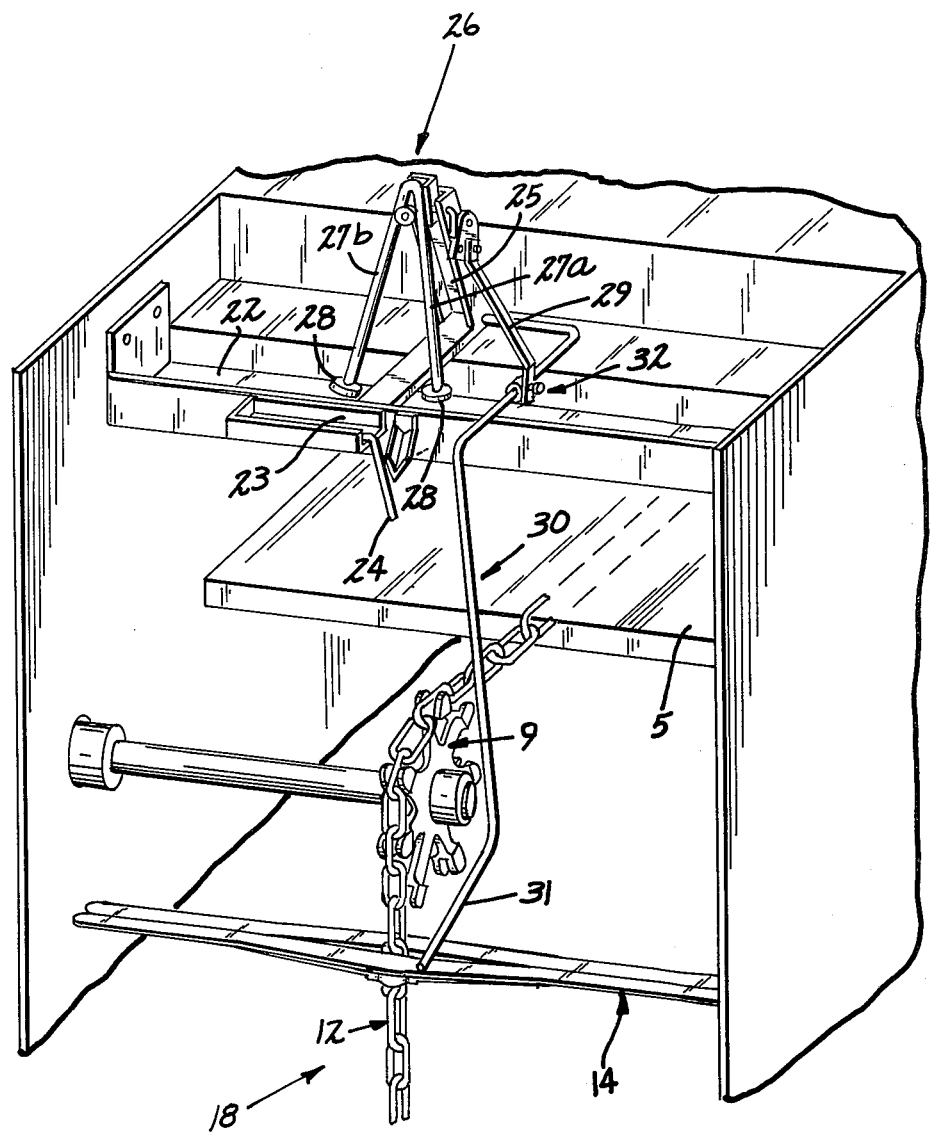
FIG. 4 shows likewise pictorially and in enlarged scale, the structure of the plunger that immerses itself in the oil pan.

Arranged above guide pulleys 9 and 10 is an oil pan 22 that is clearly recognizable in FIG. 4. The oil pan bears, on its front side, an intermediate oil pan 23 that is structured open at one end and here bears an oil drip rod 24.

Pivotably arranged on a bracket 25 above oil pan 22 is a holding device 26 for a plunger 27 with two plunger arms 27a and 27b. The plunger arms have disk-like enlargements 28 on their free ends that extend into the oil pan.

The pivot support for the plunger arms 27a and 27b consists of a lever 29 which itself, in turn, is adjustably connected to a trip lever 30 that is equipped with an outwardly bent end 31 and, in its at-rest position, i.e. in the position in which the plunger arms 27a and 27b are immersed with their disks 28 in the supply of oil in the oil pan 22, lies in the path of the scraper crosspieces 14 such that, upon further movement of the scraper crosspiece, this trip lever 30 is raised up and, thereby simultaneously swings the plunger arms 27a and 27b up out of the oil pan. In the swung out position, the plunger arm 27b arrives over the intermediate oil pan 23 and, now, the oil carried by plunger arm 27b can drip off into this intermediate oil pan. With its free end, i.e. disk 28, the plunger arm 27a arrives into a perpendicular position above the eyelet 14a and the chain member 14d that is held in this eyelet. The oil can now drip precisely on this connection point and ensures that this part that is continuously exposed to friction and movements is provided with a lubricating film, which prevents the otherwise occurring corrosion.

The setting of the trip lever 30 on lever 29 is movable, as can be recognized most clearly from the illustration in FIG. 4 at reference number 32. Possible in simplest fashion through this means are adjustments relative to swing-out height of the plunger arms 27a and 27b, and can even be done by lay persons.

Illustrated more clearly in FIGS. 5 and 6 is the swingability of plunger 27. Designated by 40 in these two figures, in a fixed component, is the pivot axis of trip lever 30, and further recognizable is that the lever 29 connects to a curved component 43 that connects rotatably to the fixed bracket 25 through means of a rotatable shaft 41. The curved component 43 bears a pivoted follower 44 that is fastened rotatably fixed to the shaft 42 that is journaled in the fixed bracket 25 and carries the support device 26 so that now, with a movement of the pivot follower 44—introduced by the movement of trip lever 30—the plunger 27 moves from the position shown in FIG. 5 into the position shown in FIG. 6.

In the raised out position (FIG. 6), the oil can now drip down from the plunger arms 27a and 27b.

Obtained in simplest fashion by means of the arrangement in accordance with the invention is continuous lubrication of the chain by means of the fact that the oil given off into the intermediate oil pan 23 by the plunger 27b now slowly drops off, via oil drip rod 24, aimed toward the spot on the draw chain where the draw chain is in contact with the guide pulley. Hence, also occurring simultaneously in this fashion is a lubrication of the guide pulley 9, i.e. of the region of friction between chain and pulley.

What is claimed is:

1. Dung removal conveyor for multideck poultry battery-nest installations having upper and lower decks with roost grates and with droppings plates, arranged under the roost grates, across which can be displaced dung removal conveyors having upper and lower runs, each dung removal conveyor consisting of a drawing means bearing scraper crosspieces and led over upper and lower guide pulleys, and looping around the installation in a longitudinal direction so that the upper conveyor runs sweep over the droppings plates of the upper deck and the lower conveyor runs sweep over the droppings plate of the lower deck, characterized by
    (a) a single-chain conveyor as a dung removal conveyor having a central draw chain to which are centrally connected by eyelets the scraper crosspieces; and
    (b) an oil pan above the upper guide pulley of each dung removal conveyor, with an oil dispensing contrivance actuated by contact with said crosspieces which feeds oil onto the draw chain in the region of the guide pulley, said oil dispensing contrivance including two plungers, of which one loads an intermediate oil pan and the other the eyelet of the scraper crosspiece.

2. Dung removal conveyor according to claim 1, characterized by the fact that the intermediate oil pan is equipped with an oil drip rod.

3. Dung removal conveyor according to claim 1, characterized by a trip lever extending into the path of the scraper crosspiece, actuation of which also moves the plungers.

4. Dung removal conveyor according to claim 1, characterized by the fact that each plunger is provided with an enlargement on the end immersed in the oil pan.

5. Dung removal conveyor according to claim 4, characterized by the fact that the enlargement is structured as a disk.

* * * * *